April 13, 1926.
R. B. McCONNEY
1,580,789
DOUBLE ACTING SHOCK ABSORBING BRAKE FOR AUTOMOBILES
Filed July 22, 1922
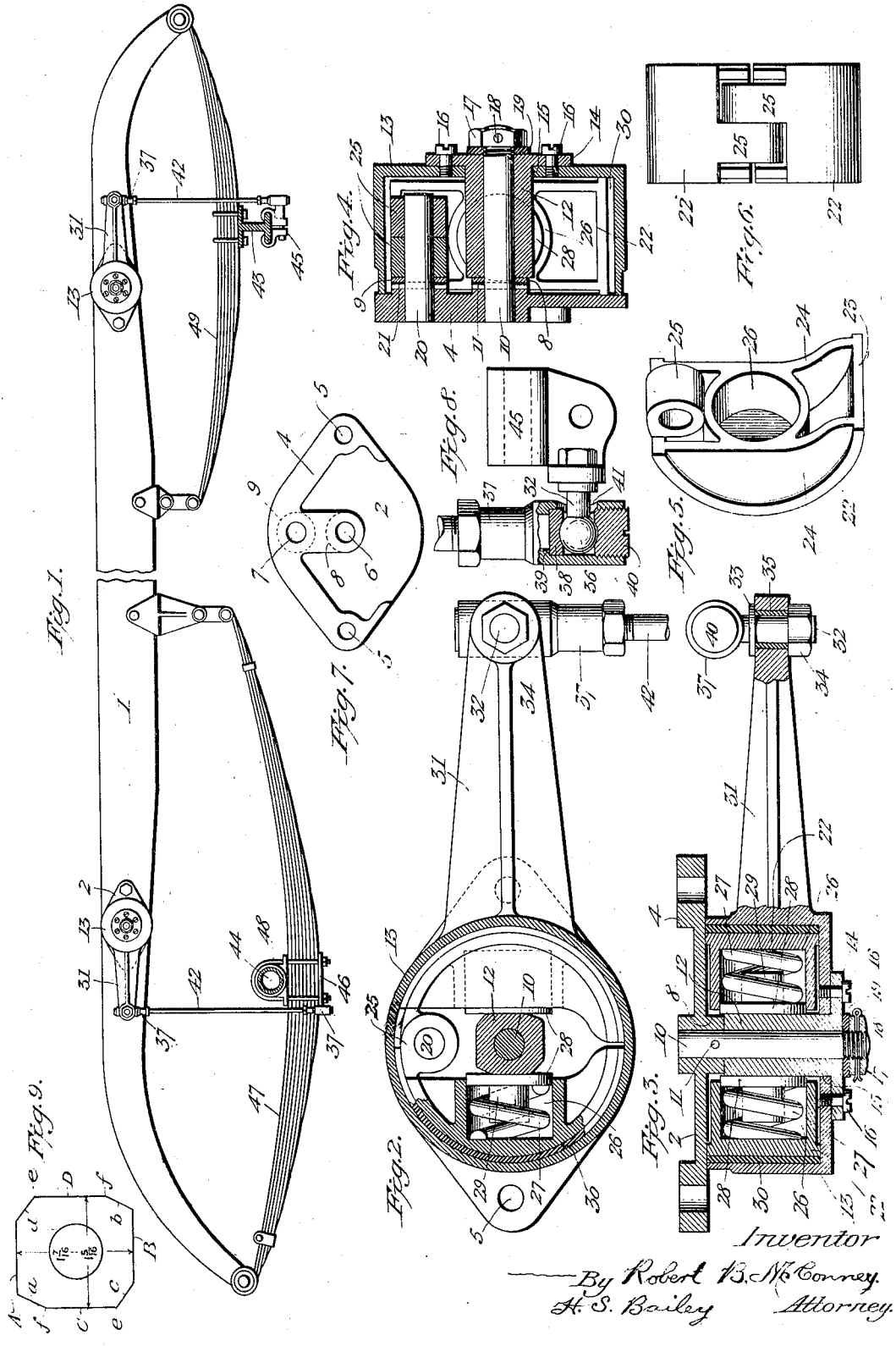
Inventor
By Robert B. McConney.
H. S. Bailey    Attorney.

Patented Apr. 13, 1926.

1,580,789

UNITED STATES PATENT OFFICE.

ROBERT B. McCONNEY, OF DENVER, COLORADO.

DOUBLE-ACTING SHOCK-ABSORBING BRAKE FOR AUTOMOBILES.

Application filed July 22, 1922. Serial No. 576,796.

*To all whom it may concern:*

Be it known that I, ROBERT B. MCCONNEY, a citizen of the United States of America, residing at the city and county of Denver and State of Colorado, have invented new and useful Double-Acting Shock-Absorbing Brakes for Automobiles, of which the following is a specification.

My invention relates to a double acting shock absorbing brake for automobiles.

And the objects of my invention are:

First. To provide a double acting, shock absorbing brake mechanism that allows perfect freedom to an automobile traveling on a level road but which instantly applies a shock resisting, resilient pressure of quick and greatly increasing tension when the chassis of the automobile drops into a chuck hole in the road or strikes a raised lump in the road-bed or a loose rock or other piece of material lying in the road.

Second. To provide a double acting, shock absorbing brake mechanism for automobiles in which a simultaneously operating double resilient shock absorbing pressure is instantly applied when the tonneau and the chassis of the automobile separate any part of the normal separating and closing movement of the automobile axle's springs when the automobile strikes either chuck-holes or rises in roads.

Third. To provide a resilient pressure and slippingly yielding form of a shock absorber for automobiles that exerts a double restraining tension of adjustable and intensely increasing resistance to the uncomfortable shocks, jars and twisting movements an automobile encounters when running over rough roads.

Fourth. To provide a double power applying mechanism for resisting and absorbing the shocks automobiles encounter in running over rough roads, that is simple in construction and can be quickly applied to stock automobiles of all makes and is adjustable to all weights of automobiles and is provided with easily replaced parts having large and practically unwearable surfaces.

Fifth. To provide a multiple surface variable throw cam for compensating for the wear of the brakeshoes, and to give a quicker and more powerful grip on high lifting shock movements of the tonneau.

I attain these objects by the mechanism illustrated in the accompanying drawings in which:

Figure 1 is a side view of one of the side bars of an automobile chassis, showing the manner of connecting the improved shock absorbing brake to the said side bar and to the front and rear axles.

Figure 2 is a side view partly in section and on an enlarged scale, of one of the shock absorbing brakes.

Figure 3 is a central, horizontal, sectional view of the same.

Figure 4 is a central vertical sectional view thereof.

Figure 5 is a perspective view of one of the brakes.

Figure 6 is a top view of the two brakes as they appear when pivotally mounted.

Figure 7 is a back view of one of the base plates which are bolted to the side bar.

Figure 8 is a view partly in section and partly in elevation, showing one of the couplers which are secured to the ends of the rods which connect the cam arms of the shock absorbers to the axles, and Figure 9 is a diagrammatic view of the power-applying cam.

Referring to the accompanying drawings, the numeral (1) indicates one of the side bars of the chassis of an automobile, to the outer face of which are bolted the base plates (2) of the improved shock absoring brake. These base plates are of substantially elliptical form and the ends are apertured to receive bolt (3), by which the plates are secured to the side bars. The back of each plate has a raised portion (4), which increases the thickness of the plate, at its ends, and center portion and along one side of the same, and through this thickened portion of the plate are formed the two bolt holes (5), a central hole (6), and a hole (7) above and in a vertical line with the central hole (6), as clearly shown in Figure 7. A circular boss (8) is formed on the front side of the plate surrounding the central hole (6), and a similar boss (9), surrounds the hole (7). A pivot pin or stem (10) is secured in the central hole (6), by a pin (11), which passes through the boss (8) and through the stem. This stem projects out beyond the plate a suitable distance, and a hub-like, double-faced, cam (12) is pivotally mounted thereon, which forms a part of, or is rigidly connected to a cylindrical housing (13) which is concentric with the axis of the stem (10). The cam (12), however, is preferably, detachably connected to the housing in the following manner:

One end of the cam terminates in a circular flange (14) which, when the cam is passed through an axial aperture (15) in the end wall of the housing, rests against the outer face of the said end wall, as clearly shown in Figures 3 and 4. The flange is provided with bolt holes through which bolts or screws (16) are passed, which secure the flange to the said end wall of the housing. Thus, the cam can be removed from the housing, when desired, for a purpose to be hereinafter set forth. The inner end of the housing (13) is open, and presents a circular rim which bears against the face of the base plate (2); and the housing is held upon the stem (10), by a nut (17) which is threaded upon the outer end of the stem, and is held against rotation by a cotter pin (18) which passes through the nut and through the stem, a fibre washer (19) being interposed between the nut and the flange (14). A pivot pin (20) is secured in the aperture (7) and through pivot pin (20), and upon the pin (20) are pivotally mounted two opposing, semi-circular brakes (22), which are constructed and arranged as follows: Each brake (22) comprises a semi-circular wall (23) and flat side walls (24), which are slightly inset from the outer edges of the semi-circular wall, to permit these edges only to bear respectively against the face of the base plate, and the face of the end wall of the housing as will be understood by reference to Figure 3. The upper portions of the brakes are formed with hinge knuckles (25), through which the pin (20) passes, the appearance of the brakes, when assembled, being shown in a top plan view in Figure 6. Each brake is formed with cylindrical chamber (26) which is positioned between its two side walls (24), and in horizontal line with the axis of the center pin (10) upon which the housing (13) is mounted. A coil spring (27) of suitable strength, is placed in each chamber (26) and a plunger comprising a disc (28) and a stem (29), is placed in each chamber, so that the discs (28) bear on one side against the springs (27) and on their opposite sides, against the adjacent sides of the hub-like cam (12); the stems (29) of the plungers extending partially through the springs (27) and thus serving to center them. A brake lining (30), of suitable composition, such as asbestos and copper wire, is interposed between the semi-circular wall of each brake (22) and the corresponding wall of the housing (13) and when the said housing is turned by the movement of the car body, in a manner to be presently explained, the cams press the plungers against the springs (27) which in turn force the brake shoes outward into frictional engagement with the brake linings (30). The discs (28) of the plungers extend a slight distance beyond the rims or edges of the chambers (26) so that they can be acted upon by the cam without the cam contacting with the said rims.

Each housing (13) is formed with a lever arm (31), the free end of which is apertured to receive a bolt (32) having a flange (33) which bears against the inner face of the lever, a nut (34) being screwed upon the outer portion of the bolt, and against the outer face of the lever. If desired, a sleeve (35) may be inserted in the hole in the end of the lever and the bolt (32) passed through the sleeve. The sleeve takes the wear of the bolt, and may be removed and a new one inserted, when necessary. The flange (33) is about midway of the length of the bolt (32), and its unthreaded portion terminates in a spherical head (36), which connects the end of the lever with a common form of coupler (37) suitable for the purpose, having a bore of two diameters which is threaded from each end inward. A disc (38) is seated on a shoulder (39) formed by the junction of the two parts of the bore, and this disc is provided with a substantially semicircular depression. A plug (40), having a corresponding depression is screwed into the outer end of this part of the bore. The spherical head (36) of the bolt (32) is inserted in an aperture (41) in the wall of the coupler (37), so as to lie between the disc (38) and the plug (40). The plug is then screwed in sufficiently to hold the spherical head between itself and the disc (38), the head resting in the opposing depression of the plug and disc, this arrangement providing a universal joint connection between the bolt and the coupler. One end of a rod (42) of suitable length is screwed into the other end of the coupler, and the other end of this rod carries a coupler which is the counterpart of the coupler (37).

It will be understood that there are two of these shock absorbers on each side bar; one above the front axle (43), and one above the rear axle (44), and the coupler on the lower end of the rod (42) of each forward shock absorber is connected by a bolt (32), with a clip (45) of any suitable character, which is bolted to the front axle, while the coupler on the lower end of the rod (42) of each rear shock absorber, is connected in a similar manner to a suitable clip (46) which, as shown, is clamped to the under leaf of the usual spring (47), by yoke bolts (48), which secure the said spring to the rear axle, these springs (47) and the forward springs (49), being secured at their ends to the side bar in the usual manner.

Referring to the diagrammatic view (Figure 9), the cam is constructed from a metal block which is rectangular in cross section, and approximately one inch and five sixteenths by one inch and seven sixteenths in area. The diagonally opposite corners of the block are cut off to form an octagonal block comprising four relatively wide sides, A. B. C. and D. and four narrower sides *a. b. c.* and *d.* Each of the wide sides is approximately seven eighths of an inch in width but four eighths of this width is on one side of the axial center of the block, and three eighths on the other side of the axial center of the block, so that the preponderance of width of the upper side A. of the block is on the left side of the center of the block, that of the lower side B. is on the right side of the center, that of the left side of the block is below the center, and that of the right side of the block is above the center. The diametrically opposite corners *e—e* and *f—f* constitute cams or cam portions. The corners *e—e* are further from the axial center of the block, than are the corners *f—f* and therefore travel in arcs of greater radius, than the corners *f—f*, so that a downward movement of the lever arm (31) and the consequent engagement of the cams *e—e* with the plungers (28) will effect a wider spreading of the said plungers and therefore a more forceful pressure of the brakes (22) upon the brake linings, than would a corresponding upward movement of the lever arm, and the consequent engagement of the cams *f—f* with the plungers. The jolt or shock caused by the drop of the vehicle body, is neutralized by the springs, and therefore does not require such a quick or powerful brake action on the part of the shock absorbers, as is required on the rebound of the body or when the body is thrown upward by the rebound action of the springs. When, therefore, the body drops, the lever arms are thereby raised and the cam corners *f—f* engage the plungers (28), and thus exert a relatively gradual pressure on the brake shoes. But as the rebound of the body is generally more sudden and also more violent than the drop, the action of the shock absorbers must be quicker, and more powerful, and to accomplish this, the cam corners *e—e*, which are now brought into action by the downward swing of the lever arms, more in arcs of a greater radius, than the corners *f—f*, and therefore, cause a quicker and more powerful spreading pressure on the plungers and brake shoes, whereby, the shock of the rebound is quickly checked and absorbed, and the springs are thus prevented from violently rebounding. The upward throw of the vehicle body, which ordinarily is due to the reaction of the violently stressed springs can therefore not take place.

The cams are constructed as "rights" and "lefts," or so that the upward movements of the lever arms will bring all of the cam corners *f—f* into action, while their downward movements will bring all of the corners *e—e* into action.

It will be understood, from the above description, therefore, that a downward swing of the lever arm will cause a quicker and more powerful action on the part of the brake shoes, than a corresponding upward movement of the said arm, thus providing for an equalization of the shock absorbing action, under either the compression or rebound of the springs. When the brake linings become worn, a slightly greater throw of the lever arm is necessary to produce the same pressure on the plungers, and to compensate for this wear it is only necessary to remove the cam hubs (12) and give them a quarter turn, by which their sides A—B which are wider apart than the sides C—D, are brought into contact with the plungers, (28), and the new cam corners will give the same pressure action under the up and down swing of the lever arms, as that originally produced by the corners *e—e* and *f—f* respectively.

In operation, the shock absorbers, or shock absorbing brakes, are secured upon the side bars of the chassis, preferably in the positions shown in Figure 1, and are connected to the front and rear axles, by the rods (42), so that any jolt or any up or down movement of the body of the car is instantaneously communicated to the absorbers in the following manner: When the wheels of a car, equipped with the improved shock absorbing brakes pass over ground sufficiently rough or uneven to impart a jolt or upward movement of the axles, the movement is communicated to the springs, and also directed to the rods (42), and thence to each pair of connected lever arms (31), which are thereby lifted or swung to a greater or less degree, whereby the housing (13) with the cam hub (12) are turned on the pivot (10). With the turning of the cam hub, the diagonally-opposite cam corners *f—f* of all of the cam hubs are, forcibly moved against the plungers (28), which thus compress the springs (27), and the pressure on said springs, spreads the brake shoes (22), which are thereby brought into forcible frictional engagement with the brake linings (30) which are interposed between the shoes and the circular wall of the housing (13), the force of the pressure exerted against the said brake shoes being proportionate to the force exerted by the downward movement of the body. As the cam action is relatively gradual, the braking power is gradually applied to the shoes (22); so that the shock is completely neutralized. On the rebound, the lever arms (31) are drawn down by the upward movement of the car body, and the turning movement of the housing (13), and its cam hub (12) is reversed, thereby causing the cam corners e—e to engage the plungers (28), and as these cam corners act to more quickly and forcibly apply pressure to the plungers and thence through the springs (27) to the brake shoes (22), the rebound of the springs is quickly checked, and the car body prevented excessive upward throw, whereby the shock of the rebound is quickly neutralized, as fully hereinbefore set forth.

The improved device is simple in construction, quick and positive in action, and in practical operation has given highly satisfactory results. While I have shown and described the preferred construction and arrangement of the improved shock absorbing brake, it is obvious that minor changes in construction may be employed, without departing from the spirit of the invention.

Having described my invention, what I claim as new and desire to secure by Letters Patent is:—

1. The combination with a base, of a housing, a brake shoe bearing upon the inner surface of the housing, spring means bearing upon the brake shoe and a rotary cam operative to variably press upon the spring means to variably press the brake shoe against the housing, said cam constructed to cause a different variation in the pressure upon the brake shoe depending upon its direction of rotation.

2. The combination with a base, a housing, a plurality of brake shoes pivotally interconnected and extending in opposite directions for contact with the housing, the pivot connection being secured upon the base, means for resiliently pressing the brake shoes against the housing, means for angularly moving the housing and the brake shoes relatively to each other, the housing, the brake shoes and said means being constructed and arranged to cause a variation in the pressure upon the brake shoes during said relative movement.

3. Apparatus according to claim 2 in which the means for resiliently pressing the brake shoes against the housing includes a coil spring bearing against each brake shoe, a disk member bearing upon each spring and a rotary cam member acting upon the said disk members.

4. Apparatus according to claim 2 in which each brake shoe defines an inwardly directed radial housing and the means for resiliently pressing the brake shoes against the housing includes a coil spring disposed in each housing, a disk member bearing upon each spring and a rotary cam member acting upon the said disks.

5. The combination with the frame and axle of a vehicle, of a shock absorber, comprising a fixed and a rotatable member connected respectively to the frame and axle, said rotatable member having a circular wall, a double acting axial cam on the rotatable member, opposing brake shoes pivoted at one end to said fixed member, and engaging said circular wall, and coil springs interposed between the cam faces and the brake shoes whereby movement of said rotatable member causes said cam to force said shoes against the wall with a resilient pressure.

6. A double acting shock absorbing brake for automobiles; consisting of a base-plate adapted to be secured to the chassis of an automobile and provided with a circular lug portion provided with a central hub; an axial pin secured to said lug; a sleeve form of cam loosely surrounding said pin provided with variable throw cam surfaces on its opposite sides; a cylindrical member fitting rotatively the lug member of said base; a flange member on said cam sleeve removably secured to said cylinder; whereby said cam sleeve is rotatively turned by said cylinder on said axial pin; a pair of brake shoes pivotally secured to said base-plate provided with brake surfaces concentric to said axial pin; and each having a curved brake surface fitting the inner wall of said cylinder; said brake shoes being arranged to extend in opposite directions from their pivotal support around the inner wall of said cylinder; a spring between the cams on each side of said cam sleeve and each adjacent brake shoe; an arm extending from said cylinder and an adjustable rod extending from said arm and secured to a tonneau supporting spring of said automobile.

7. In a double acting shock absorbing brake for automobiles, the combination with a base plate secured to the side bars of the chassis of an automobile; of an armed cylinder rotatively mounted on said base and connected by a rod to a supporting spring of the tonneau of an automobile; brake shoes engaging the opposite sides of the inner wall of said cylinder; a member having oppositely disposed cam faces secured to said cylinder at its axial center and coiled springs between said cams and said brake shoes.

8. In a double acting shock absorbing brake for automobiles; the combination of a base-plate and its axial pin; an armed cylinder fitting on said base-plate; a cam sleeve fitting over said axial pin; and provided with oppositely and diametrically positioned cam surfaces; and removably secured to said cylinder; the brake shoes pivotally secured to said base-plate; the brake lining between the brake shoes and said cylinder; and the coiled springs between said cams and said brake shoes.

9. In a double acting shock absorbing brake for automobiles, the combination with the side bar and the side spring, of a base plate secured to the side bar, a double faced cam pivotally mounted on said base plate, a cylindrical housing secured to said cam and concentric with its axis, brake shoes having brake linings in engagement with said cylindrical housing, coil springs interposed between the cam and the brake shoes, and disks interposed between the inner ends of said springs and the faces of said cam, said brake shoes being provided with spring-receiving sockets.

10. In a shock absorbing device of the character described the combination with the side bars, the axles and the springs of a chassis, of cylindrical housings pivotally mounted on said side bars each having a lever arm and an axial double faced cam, a rod connecting the lever arm with the adjacent axle whereby vertical movement of the axle or chassis is transmitted to the lever arm; opposing semi-circular brake shoes within the housing but pivotally connected to the side bar, spring pressed plungers in said brake shoes which engage the opposite faces of said cam, whereby when the housing is turned in either direction, the cam acts to spread the shoes and force them into engagement with the wall of the housing.

11. In a shock absorbing device of the character described, the combination with the side bar, the axle and the spring of a chassis, of a base plate secured to the side bar, having an axial pivot pin, and a pin in vertical line with the axial pin, opposing semi-circular brake shoes pivotally supported on the upper pin; a cylindrical housing closely surrounding said brake shoes and having an axial hub-like double faced cam through which said axial pin passes and which is disposed between said brake shoes, a lever arm on the housing, and a rod connecting the same with the adjacent axle, whereby movement of the axle or chassis, causes the housing to turn on its pivot pin, whereby the double faced cam spreads the brake shoes into forcible contact with the wall of the housing; and means for securing the housing upon its pivot pin.

12. In a device of the character described, the combination with an axially pivoted cylindrical housing, opposing semicircular brake shoes pivotally mounted within but independent of the housing, and spring pressed plungers in said brake shoes; of an axial hub-like, double faced cam on said housing which is disposed between said brake shoes, whereby when the housing is turned, the cam spreads the brake shoes into forcible contact with the wall of the housing.

13. In a device of the character described, the combination with the side bars, the axles and the springs of a chassis, of base plates secured on the side bars each of which has an axial pin and a pin preferably in vertical line with the axial pin, opposing semicircular brake shoes having hinge knuckles which are mounted on the upper pin, said brake shoes having opposing cylindrical chambers, coil springs seated in said chambers, plungers in said chambers which bear against said springs; a cylindrical housing which closely surrounds said brake shoes, an axial hub-like double faced cam removably secured to said housing and disposed between said plungers, said axial pin passing through said hub cam, and means for securing said housing upon said pin; a lever arm on the housing, and a rod connecting the lever arm and the adjacent axle, whereby the housing with its cam is turned by vertical movement of the chassis or axle thereby spreading the brake shoes into forcible contact with the wall of the housing.

14. In a device of the character described, the combination with opposing, semicircular hinged brake shoes, of an axially pivoted cylindrical housing surrounding said brake shoes and brake linings interposed between the brake shoes and the wall of the housing, said housing having a flat front wall with an axial hole, a flanged hub-like double acting cam which is inserted in said hole and disposed between said shoes, said flange being bolted to the said front wall of the housing, a fixed pivot pin passing through said cam, said cam having two diagonally opposite corners separated by a predetermined space, and two diagonally opposite corners separated by a greater space than the first two corners, whereby, when the housing is turned in one direction, the cam corners nearest together engage the shoes, and when turned in the opposite direction the cam corners furthest apart engage the said shoes, the said shoes being spread a greater distance by a movement of the housing in one direction, than by a corresponding movement of the housing in the opposite direction.

15. In a device of the character described, the combination with opposing hinged semicircular brake shoes having opposing cylindrical chambers, coil springs in said chambers, and plungers in said chambers bearing against said springs; of an axially pivoted double acting cam disposed between and in engagement with said plungers having diametrically opposite flat sides, diagonally opposite corners separated by a predetermined space and diagonally opposite corners separated by a greater space than the first two corners, a cylindrical housing surrounding said shoes, to which said cam is removably secured, and which is concentric with the axis of the cam, and brake linings between said shoes and the wall of said housing, said cam acting to separate the shoes a greater distance when turned in one direction, than when turned a corresponding distance in the opposite direction.

In testimony whereof I affix my signature.

ROBERT B. McCONNEY.